(12) United States Patent
Benson et al.

(10) Patent No.: US 10,819,751 B2
(45) Date of Patent: Oct. 27, 2020

(54) FIREWALL MANAGEMENT SERVICE ARCHITECTURE

(71) Applicant: Amazon Technologies, Inc., Seattle, WA (US)

(72) Inventors: Bryan Mark Benson, Seattle, WA (US); Kalyanaraman Prasad, Redmond, WA (US); Andrew Chen, Bellevue, WA (US); Wenchuan Weng, Los Angeles, CA (US); Prashanth Acharya, Sammamish, WA (US); Andrew L. Thomas, Seattle, WA (US); Hatem Mohamed Moustafa Eyada, Redmond, WA (US); Venkatesh Vijayaraghavan, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 328 days.

(21) Appl. No.: 16/001,825

(22) Filed: Jun. 6, 2018

(65) Prior Publication Data
US 2019/0306194 A1 Oct. 3, 2019

Related U.S. Application Data

(60) Provisional application No. 62/651,007, filed on Mar. 30, 2018.

(51) Int. Cl.
*H04L 29/06* (2006.01)
*H04L 12/24* (2006.01)

(52) U.S. Cl.
CPC .............. *H04L 63/20* (2013.01); *H04L 41/06* (2013.01); *H04L 41/0816* (2013.01);
(Continued)

(58) Field of Classification Search
CPC . H04L 63/02; H04L 63/0209; H04L 63/0227; H04L 63/101; H04L 63/102;
(Continued)

(56) References Cited

U.S. PATENT DOCUMENTS

2005/0273851 A1* 12/2005 Raju Datla ......... H04L 63/1425 726/14
2007/0061125 A1* 3/2007 Bhatt .................. H04L 63/1433 703/20

(Continued)

OTHER PUBLICATIONS

International Search Report and Written Opinion for International Application No. PCT/US2019/024747, dated Jul. 26, 2019, 14 pages.

*Primary Examiner* — Minh Dinh
(74) *Attorney, Agent, or Firm* — Lowenstein Sandler LLP

(57) ABSTRACT

A processing device receives an event notification indicating a security configuration change of a cloud computing resource associated with a member account. In response, the processing device identifies a security policy associated with an administrative account corresponding to the member account and evaluates the security policy against the security configuration change to determine compliance with the policy. If not in compliance, the processing device generates a change event indicating a repair to the security configuration of the cloud computing resource to bring the security configuration into compliance with the security policy.

20 Claims, 7 Drawing Sheets

(52) U.S. Cl.
CPC ............ *H04L 63/02* (2013.01); *H04L 63/101* (2013.01); *H04L 63/102* (2013.01); *H04L 41/28* (2013.01); *H04L 63/0209* (2013.01)

(58) Field of Classification Search
CPC ..... H04L 63/20; H04L 41/06; H04L 41/0816; H04L 41/28
See application file for complete search history.

(56) References Cited

U.S. PATENT DOCUMENTS

| | | | |
|---|---|---|---|
| 2014/0359749 A1* | 12/2014 | Rieke | ................ H04L 63/02 726/11 |
| 2016/0072831 A1 | 3/2016 | Rieke | |
| 2018/0027006 A1 | 1/2018 | Zimmermann et al. | |

* cited by examiner

FIREWALL MANAGEMENT SERVICE ARCHITECTURE

RELATED APPLICATIONS

This application claims priority to U.S. Provisional Application No. 62/651,007, filed Mar. 30, 2018, the entire contents of which are hereby incorporated by reference herein.

BACKGROUND

Cloud computing defines a model for enabling ubiquitous, convenient, on-demand network access to a shared pool of configurable computing resources (e.g., networks, servers, storage, applications, services) that can be rapidly provisioned and released with minimal management effort or service provider interaction. Certain characteristics of the cloud computing model include on demand self-service, broad network access, resource pooling, rapid elasticity, and measured service. Cloud computing can include several service models, including Software as a Service (SaaS), Platform as a Service (PaaS), and Infrastructure as a Service (IaaS). The cloud computing model may be implemented according to one of the several deployment models, including private cloud, community cloud, public cloud, or hybrid cloud.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

DETAILED DESCRIPTION

Figure 1:
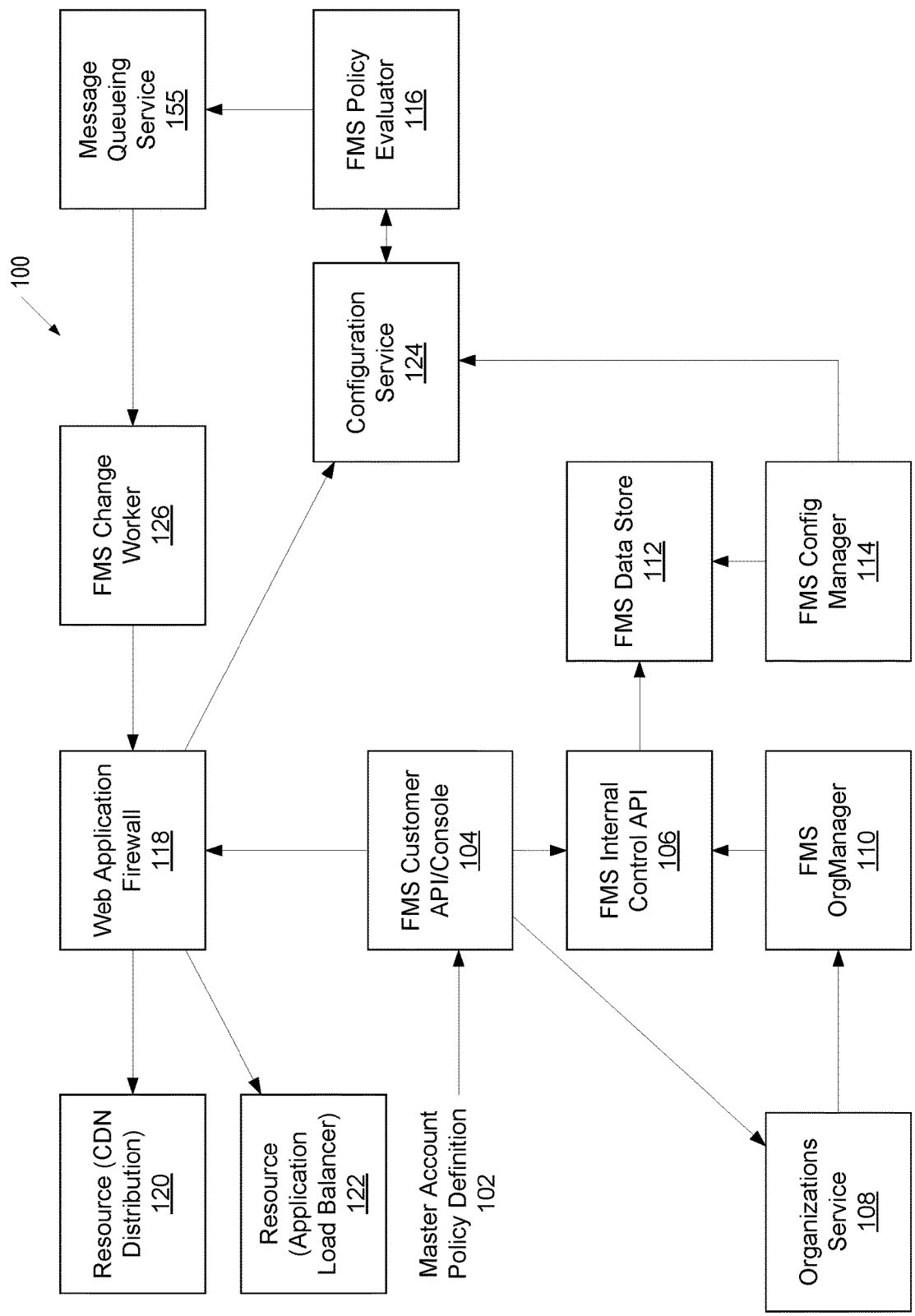
FIG. 1 is a block diagram illustrating a firewall management service architecture, according to an embodiment of the present disclosure.

The present disclosure relates to an architecture for a Firewall Management Service (FMS) used to manage security policies across multiple accounts in a web services context. In conventional web services systems, customers with multiple accounts may have difficulty managing their security posture across those multiple accounts. Security policies are traditionally account specific. Since a web service resource, or network of resources, such as an application load balancer, content delivery network distribution, virtual computing resource, managed service, or security group, for example, operates within a single account and does not span across multiple accounts, there is no conventional service that can provide for security policies pertaining to the web service resource across multiple accounts. Rather, the security policy for the web service resource is defined separately for each account which has access to the resource. For customers with only a single account or a small number of accounts, cross-account security policy management may be a lesser concern. But over time, customers have started increasing the number of accounts they have (e.g., up to 100 accounts or more). Thus, the challenges with managing security policies across those accounts have increased dramatically.

In one embodiment, a customer may have one administrative account, for example, through which the customer can define security policies for one or more web service resources. The security policies may include configuration rules specifying parameters, such as resource type, scope, tag or accounts to which the policy is applicable. In one embodiment, the scope defines an inclusion or exclusion of resources for protection under the security policies based on a resource name or other identifying attribute, including an associated tag. The tag may include a key-value pair including a customizable identifier for the associated resource. For example, one security policy may include a configuration rule specifying that an application load balancer with a tag labeled "production" should have an associated web access control list (WebACL) with a blacklist of certain Internet Protocol (IP) addresses that are prohibited from accessing the application load balancer. The customer may further have one or more member accounts associated with the administrative account. In one embodiment, the FMS described herein addresses the challenges described above by allowing these member accounts to inherit the security policies defined by the administrative account, according to the parameters in the policy configuration rules.

In one embodiment, FMS interfaces with a number of existing cloud services to coordinate security policy management across multiple customer accounts (i.e., the member accounts associated with the administrative account). In one embodiment, FMS utilizes an event based model whereby FMS receives event notifications from a configuration service, which tracks any changes to the security configurations of certain resources. The event based model allows FMS to scale easily as the number of resources and accounts increase. Poll-based models used in conventional systems that periodically poll resources to obtain status or configuration information often become too time and resource intensive as the scale of the system increases. Additional details of the FMS are provided below with respect to FIGS. 1-6.

FIG. 1 is a block diagram illustrating a firewall management service architecture 100, according to an embodiment of the present disclosure. In one embodiment, the FMS architecture 100 includes FMS customer application programing interface (API) or graphical user interface (GUI) console 104, FMS internal control API 106, FMS OrgManager component 110, FMS data store 112, FMS Configuration Manager component 114, FMS policy evaluator 116, and FMS Change Worker 126.

In one embodiment, a customer defines a security policy through an associated administrative account. For example, the customer may provide an administrative account policy definition 102 to the FMS customer API/GUI console 104. As described above, the policy may relate to the security posture associated with resources available to that administrative account in a web services environment. In one embodiment, the FMS internal control API 106 obtains the policy definition from console 104 and stores the policy definition in FMS data store 112. For example, FMS internal control API 106 may perform a create, read, update and delete (CRUD) operation in FMS data store 112, which may include for example, a NoSQL database or other data store. In one embodiment, the policy definition 102 includes an identifier of the administrative account. The policy definition 102 may also include input information defining such parameters as resource type, scope, tag or accounts to which the policy is applicable.

In one embodiment, upon receiving the policy definition, console 104 may further request member account information from an organizations service 108. Organizations service 108 may manage and track the relationships between the administrative account and one or more member accounts associated with the administrative account. Member accounts may be associated with the same customer as the administrative account, but may have different resource access capabilities and fewer permissions, such as that member accounts may not be permitted to define security policies. Depending on the received policy definition 102, certain security policies defined by the administrative account may be applied to the member accounts associated with that administrative account according to the organizations service 108. In one embodiment, console 104 sends the identifier of the administrative account from policy definition 102 to the organizations service 108. In response, the organizations service 108 may consult an associated data store to determine one or more member accounts associated with the administrative account. The organizations service 108 then notifies FMS of those member accounts. In one embodiment, the organizations service 108 sends a notification of the member accounts associated with the administrative account to a message queuing service in response to the request from console 104. In another embodiment, the organizations service 108 generates event based notifications each time there is a change in the member accounts. For example, if a new member account is created, deleted or modified, the organizations service 108 may send a notification of this event to the message queuing service. In one embodiment, the FMS OrgManager component 110 will pick up event messages from the message queueing service and provide the indication of the member accounts or the change in member accounts to the FMS internal control API 106. In one embodiment, FMS internal control API 106 stores the member account information in FMS data store 112 along with the administrative account policy definition 102. By doing so, FMS internal control API 106 can propagate the security policy defined in policy definition 102 for the administrative account to one or more of the associated member accounts without having to reconfigure the policy separately for each member account.

In one embodiment, an FMS Configuration Manager component 114 will then retrieve the saved policy data and saved member account information from FMS data store 112 and invoke a Config API to create a Config Rule using a configuration service 124. Configuration service 124 checks for change notifications from the web services system. For example, configuration service 124 may detect the addition of a new member account or the definition of a new security policy from the data obtained from FMS Config manager 114. In one embodiment, configuration service 124 maintains an indication of the current and historical state of the web services system, including which resources are present, a security posture associated with those resources, which accounts have access to which resources, which member accounts are associated with which administrative account, etc. As new data becomes available, such as member account information provided by FMS Configuration Manager 114, configuration service 124 can compare that new data to the stored state data to detect any changes in configuration. For example, if the prior state data maintained by configuration service 124 indicated three member accounts associated with a particular administrative account, but the new member account information read from FMS data store 112 by FMS Configuration Manager 114 indicates four member accounts, configuration service 124 would detect the addition of that new member account.

In addition, configuration service 124 receives event notifications from web application firewall 118 about the current security configuration of cloud computing resources associated with the web application firewall 118. Examples of these resources include a CDN distribution 120 or an application load balancer 122. In other embodiments, the FMS architecture 100 may include other resources for which the security configuration can be managed. In addition to the examples provided above, these resources may include instances of virtual computing resources, one or more managed services, network firewalls or security groups, or any other cloud computing resource or service that utilizes security elements. Each of these resources may be assigned to a particular account, and may have a corresponding security configuration including one or more security elements associated with the resource. For example, the application load balancer 122 may have an associated web access control list (WebACL). If that security configuration were to change (e.g., if the WebACL was removed from application load balancer 122), web application firewall 118 may generate an event notification and provide that notification to configuration service 124. In addition to a WebACL, a resource security element may include any object, element or feature which selectively restricts access to or operation of the corresponding resource.

In one embodiment, upon receiving an event notification indicating a configuration change, configuration service 124 invokes FMS policy evaluator 116. FMS policy evaluator 116 compares the resource security configuration information received from web application firewall 118 to the applicable policy definition associated with the administrative account and propagated to the associated member accounts. In one embodiment, for example, the security policy definition may specify that application load balancer 122 should have an associated WebACL configured in a certain manner. If the event notification received by configuration service 124 indicates that the WebACL has been removed from application load balancer 122, or has been reconfigured in a way to be inconsistent with the security policy, FMS policy evaluator 116 may determine that the application load balancer 122 is in violation of the parameters of the security policy.

Upon such a determination, policy evaluator 116 may generate a change event notification indicating an action to be taken to bring application load balancer 122 back in compliance with the security policy. In one embodiment, policy evaluator 116 sends the change event notification to the message queuing service 155. Messages in the queue of message queueing service 155 may be picked up by an FMS Change Worker 126 which can invoke a web application firewall (WAF) API. FMS Change Worker 126 instructs WAF 118 to fix application load balancer 122 by reapplying or reconfiguring the WebACL, for example. Once the configuration is updated, WAF 118 will send another notification to configuration service 124 which triggers a compliance re-evaluation by policy evaluator 116. If it is determined that the application load balancer 122 is now in compliance with the policy, the compliance result will be stored in the FMS data store 112.

Figure 2:
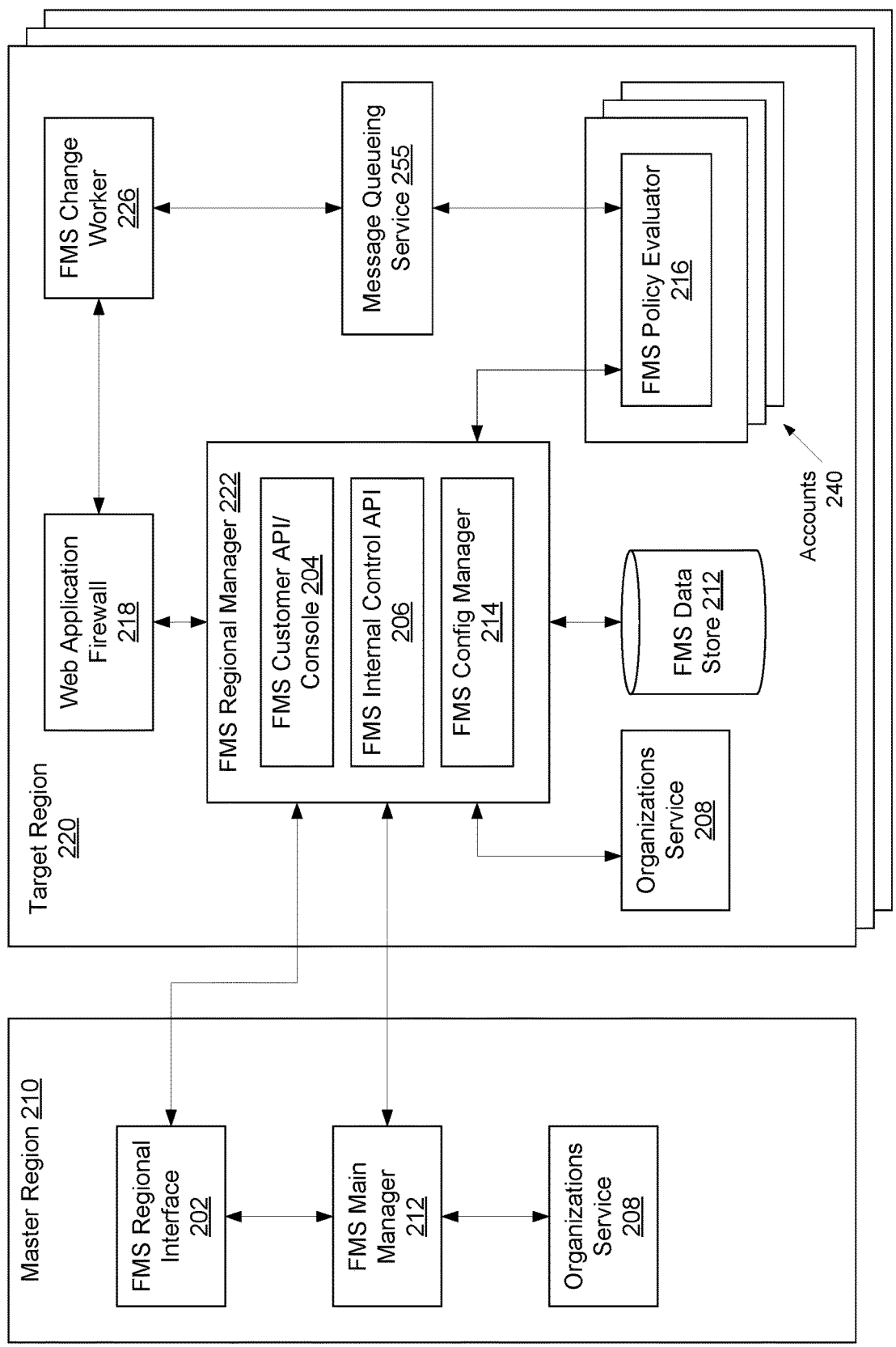
FIG. 2 is a block diagram illustrating a regional firewall management service architecture, according to an embodiment of the present disclosure.

FIG. 2 is a block diagram illustrating a regional firewall management service architecture, according to an embodiment of the present disclosure. The illustrated architecture provides a regional FMS service that can also support a global mode without the need to re-design the FMS architecture and code. The system includes of some global components that reside in a FMS master region 210, and regional components that run independently within each of one or more FMS supported regions, such as target region 220.

In one embodiment, the global components in master region 210 include an FMS Main Manager 212, and a FMS Regional Interface 202. The FMS Main Manager 212 can perform a number of operations from within the context of the master region 210. In one embodiment, FMS Main Manager 212 integrates with the organizations service 208 to on-board/and off-board the FMS service into an organization/organization-account. As discussed above, organizations service 108 may manage and track the relationships between the administrative account and one or more member accounts associated with the administrative account. Certain security policies defined by the administrative account may be applied to the member accounts associated with that administrative account according to the organizations service 208. In one embodiment, organizations service 208 tracks one or more member accounts associated with the administrative account and notifies FMS Main Manager 212 of those member accounts. In one embodiment, the organizations service 208 generates event based notifications each time there is a change in the member accounts (e.g., the addition or removal of a member account). In one embodiment, FMS Main Manager 212 further propagates global notifications to the FMS regional interface 202 for further processing and processes incoming aggregated resource compliance status from FMS regional manager 222 in target region 220.

In one embodiment, the FMS regional interface 202 can call FMS regional internal control API 206 in the FMS regional manager 222 to handle global notifications in the supported regions, such as target region 220. In one embodiment, a customer may define specific security policies for each region. In one embodiment, the particular geographic region where cloud computing resources are located may be subject to certain security risks. For example, there may be certain geographic regions where the likelihood of an attempted security breach is more likely. As such, stricter security policy may be appropriate for that region relative to other regions. In one embodiment, FMS regional interface 202 can interact with the FMS regional manager 222 in each of the supported regions to receive notifications, such as event notifications indicating the security configuration status of resources in that region. In addition, FMS regional interface 202 can perform cleanup of global resources within organization accounts.

In one embodiment, FMS will provide regional endpoint URLs that provide a regional customer API 204 in each FMS supported region, such as target region 220. The regional components include an FMS Regional Manager 222, a policy evaluator 216, and an FMS change worker 226. In one embodiment, the FMS regional manager 222 includes FMS regional customer API/Console 204, FMS internal control API 206, FMS Config manager component 214, and has an associated FMS data store 212. The FMS Regional Manager 222 can handle user interactions from the customer API/console, such as receiving security policy definitions. In addition, FMS Regional Manager 222 can perform a number of operations from within the context of the target region 220. In one embodiment, FMS Regional Manager 222 can integrate with the organizations service 208 to obtain a per organization account list, as described above. FMS Regional Manager 222 can further process FMS policy updates, where it will use the organizations data from organizations service 208 to update a local policy database in FMS data store 212 and trigger corresponding work flows, as will be described in more detail below. FMS Regional Manager 222 can also provide, for example, a list of WAF Rule Groups per administrative account and resource type if applicable, adjust WAF Rule Group sharing permissions as per FMS policy updates, and maintain one or more WebACLs per FMS policy that is shared by all organization member accounts. FMS Regional Manager 222 can further: update Config rules as per FMS policy updates in all organization accounts, process FMS Config notifications, and update the local resource/compliance database in FMS data store 212. Furthermore, FMS Regional Manager 222 can restore WebACLs in member accounts in case they are modified by the account local users such that they are no long in compliance with the associated security policies, and provide aggregated compliance status notifications to the FMS main manager 212. The FMS Policy Evaluator 216 can evaluate the current state of a resource security configuration and generate notifications in case of a compliance status change. In one embodiment, there is a separate instance of FMS Policy Evaluator 216 for each of one or more member accounts 240. The FMS Change Worker 226 can perform repairs to the resource security configuration, such as the addition, removal or modification of a WebACL associated with a resource, based on the compliance notifications.

Figure 3:
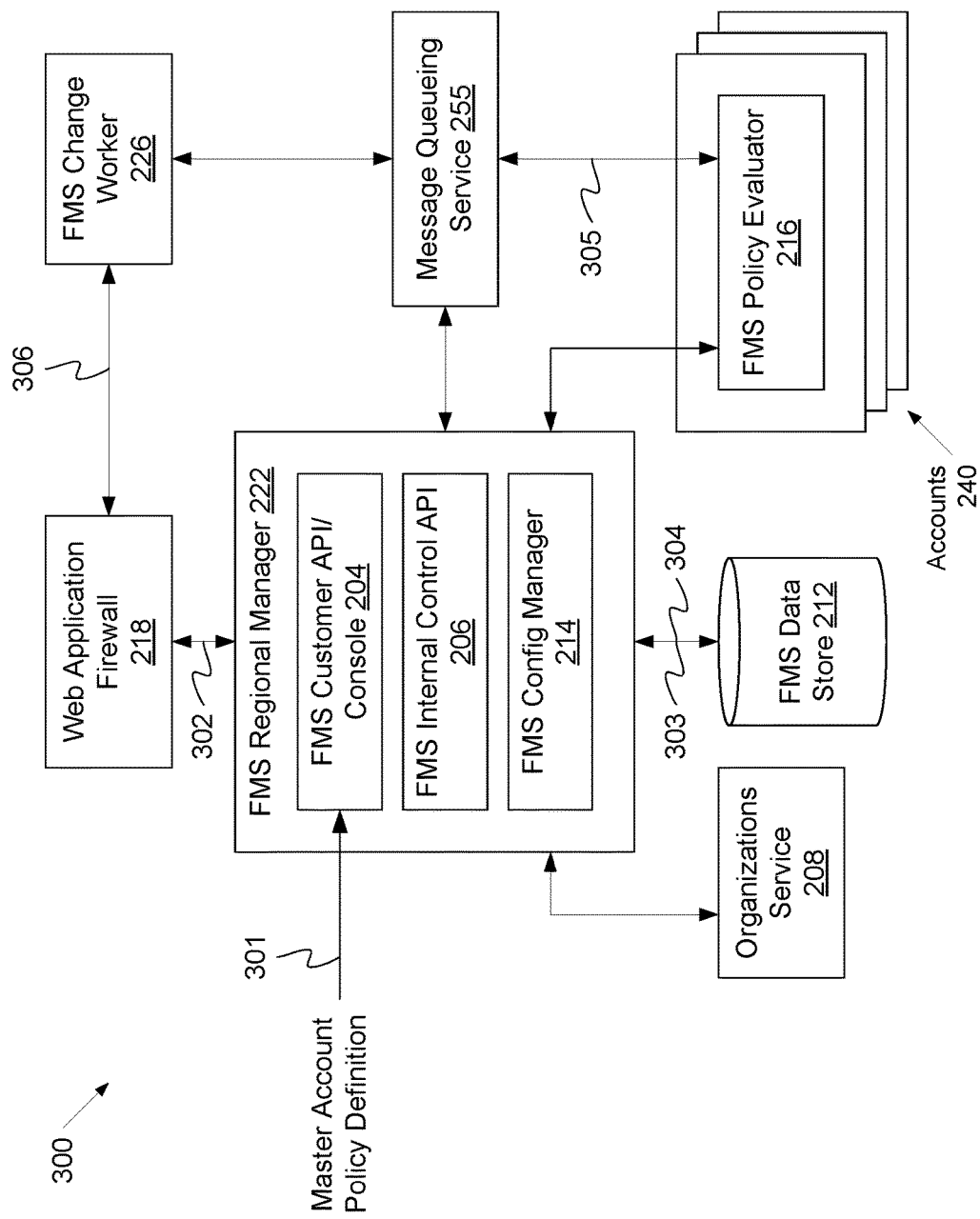
FIG. 3 is a block diagram illustrating a security policy activation workflow, according to an embodiment of the present disclosure.

FIG. 3 is a block diagram illustrating policy a activation workflow, according to an embodiment of the present disclosure. As used herein, policy activation refers to the action of applying an FMS policy to a set of cloud computing resources. In one embodiment, processing such an action includes the following operations in workflow 300.

At 301, FMS customer API/console 204 receives an administrative account policy definition. FMS customer API/console 204 may verify the credentials of the caller (e.g., to confirm that the definition came from an authorized user of the customer administrative account). If the call did not come from an authorized user (e.g., the administrative account administrator), FMS customer API/console 204 may fail the request to activate the policy. If the caller is authenticated, FMS customer API/console 204 may call the FMS internal control API 206 to persist the policy activation in FMS data store 212.

At 302, the FMS internal control API 206 may check to see if the requested policy already exists. If the policy does exist, FMS config manager 214 may identify any changes from the existing policy and fail the request if the requested version doesn't match the existing version. In case the policy is new or the Rule Group list changed, the FMS config manager 214 can create a new non-empty WebACL and set the permissions to allow all accounts in the organization to use that WebACL. If the action fails, FMS config manager 214 generates a fail response and sends it back to the FMS customer API 204.

At 303, FMS internal control API 206 updates the new policy structure with an identifier of the new WebACL, and then atomically saves the updated policy into FMS data store 212. If the save fails due to a version mismatch, FMS internal control API 206 generates a fail response and sends it to the FMS customer API 204. Otherwise, FMS internal control API 206 generates a success response and sends it to the FMS customer API 204.

At 304, FMS Config manager 214 will check the policy table and update the affected Config rule or rules in all organization accounts given as inputs the new policy version, account identifier list, WebACL identifier, resource type and optionally tag(s), excluded resource identifiers, and the rule name.

At 305, FMS Policy Evaluator 216 will start using the new Config rule and generate messages to the FMS change worker 226 in case a non-excluded resource is created, deleted, or determined to be non-compliant with the new Config rule. In one embodiment, FMS Policy Evaluator 216 provides the messages to a message queuing service 255, to which FMS change worker 226 can subscribe. Each message may contain the resource identifier, type, account identifier, and the rule WebACL identifier.

At 306, upon receiving the previous message, the FMS change worker 226 will associate the resource with the given WebACL identifier, to bring the resource in compliance with the Config rule. If the update fails, then the FMS change worker 226 may generate an error log.

Figure 4:
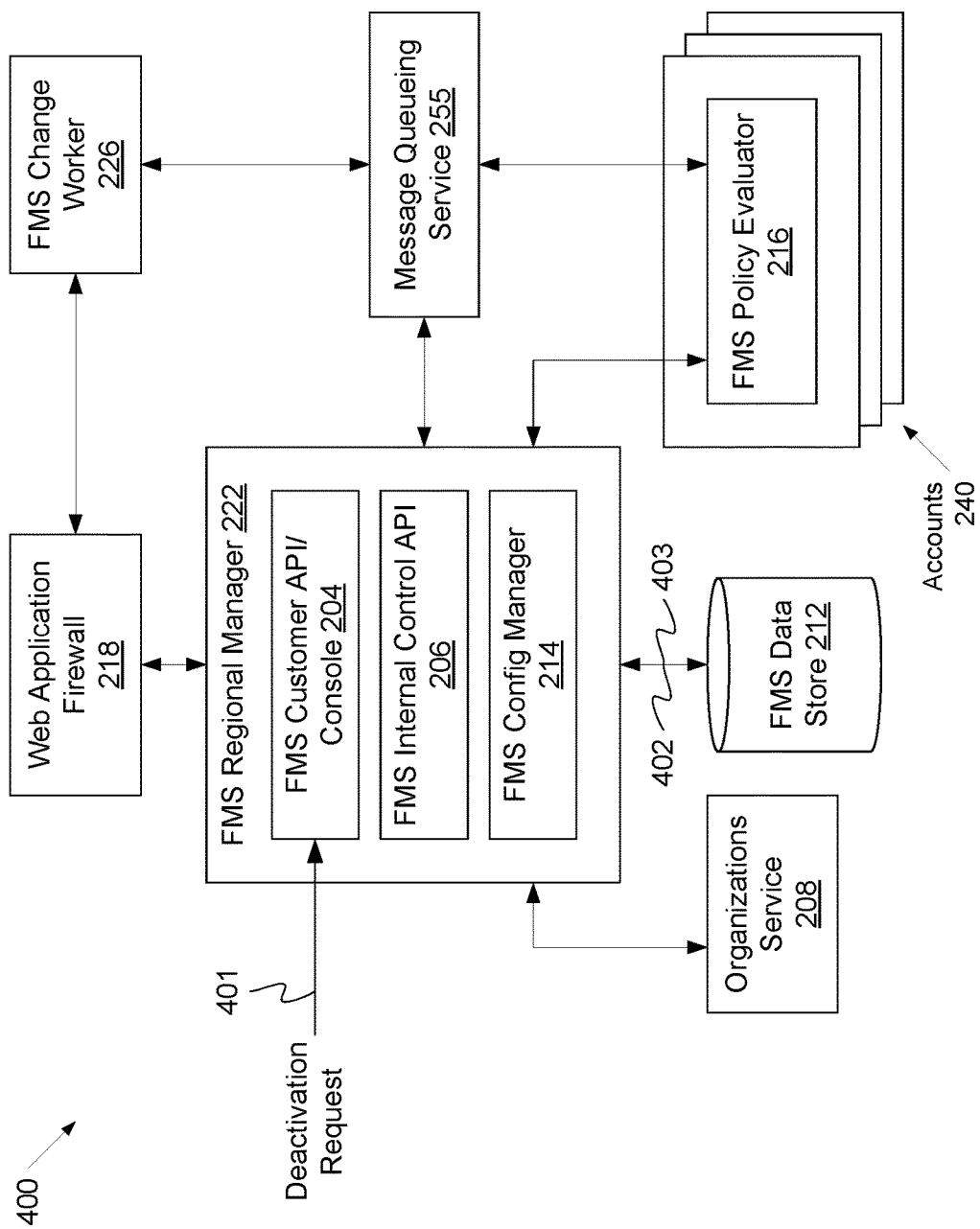
FIG. 4 is a block diagram illustrating a security policy deactivation workflow, according to an embodiment of the present disclosure.

FIG. 4 is a block diagram illustrating policy deactivation workflow, according to an embodiment of the present disclosure. As used herein, policy deactivation refers to the action of either updating an FMS policy with an activated flag turned off or deleting the policy. In one embodiment, processing such an action includes the following operations in workflow 400.

At 401, FMS customer API/console 204 receives a policy deactivation request (e.g., an API with activate flag off or a delete policy command) for an already active policy. FMS customer API/console 204 may verify the credentials of the caller (e.g., to confirm that the request came from an authorized user of the customer administrative account). If the call did not come from an authorized user (e.g., the administrative account administrator), FMS customer API/console 204 may fail the request to activate the policy. If the caller is authenticated, FMS customer API/console 204 may call the FMS internal control API 206 to persist the policy deactivation.

At 402, the FMS internal control API 206 may check to see if the requested policy already exists. If the policy does exist, FMS internal control API 206 may identify any changes from the existing policy and fail the request if the requested version doesn't match the existing version. FMS internal control API 206 may atomically update the policy in the FMS data store 212, or delete it. If the action fails, FMS internal control API 206 generates a fail response and sends it back to the FMS customer API 204, otherwise FMS internal control API 206 sends a success response. Upon success, FMS internal control API 206 add the WebACL identifier to a persistent delete queue that will delete the WebACL later after all its user resources no longer refer to it.

At 403, FMS Config manager 214 will periodically check the policy table and delete the affected Config rule(s), WebACLs, or other resources created on behalf of a policy in all organization accounts from FMS data store 212.

Figure 5:
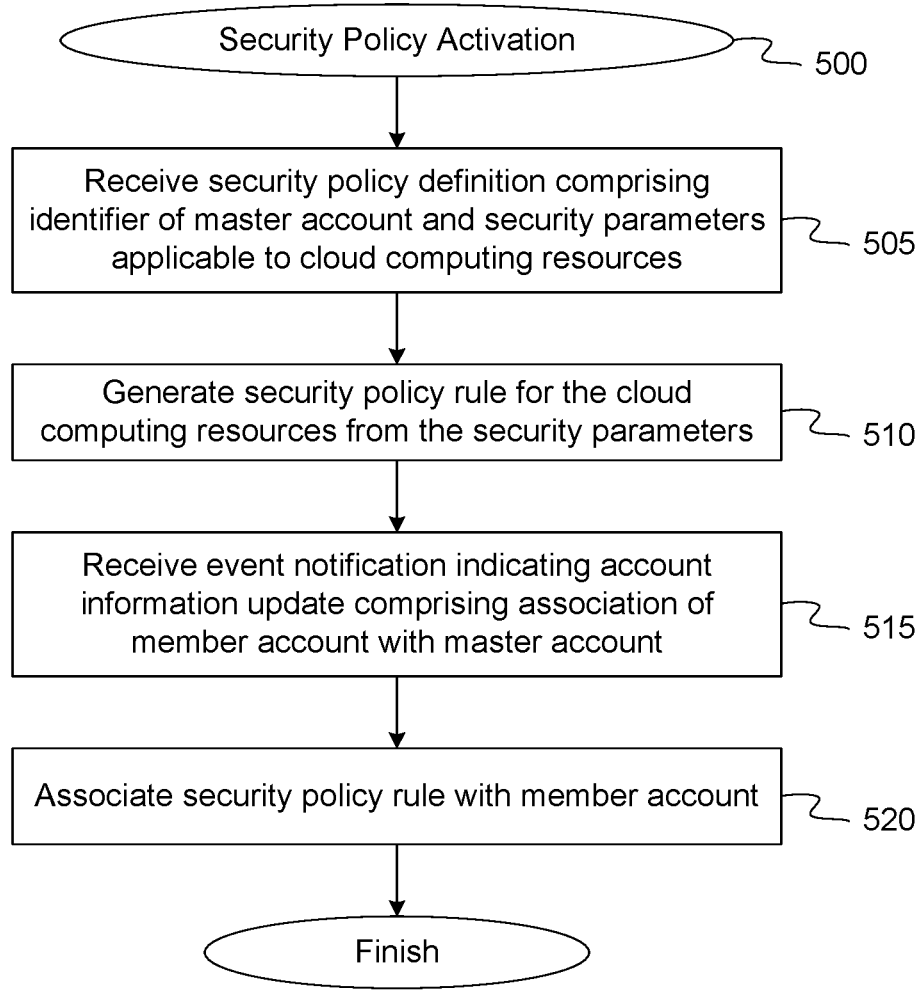
FIG. 5 is a flow diagram illustrating method of security policy activation, according to an embodiment of the present disclosure.

FIG. 5 is a flow diagram illustrating method of security policy activation, according to an embodiment of the present disclosure. The method 500 may be performed by processing logic that comprises hardware (e.g., circuitry, dedicated logic, programmable logic, microcode, etc.), software, firmware, or a combination thereof. In one embodiment, method 500 may be performed by the various components of FMS, as shown in FIGS. 1-4.

Referring to FIG. 5, at block 505, method 500 receives a security policy definition 102, the security policy definition comprising an identifier of an administrative account and one or more security parameters applicable to cloud computing resources. In one embodiment, FMS customer API/GUI console 104 receives the administrative account policy definition from a client computing device. As described above, the policy may relate to the security posture associated with resources available to that administrative account in a web services environment. In one embodiment, the FMS internal control API 106 obtains the policy definition from console 104 and stores the policy definition in FMS data store 112.

At block 510, method 500 generates a security policy rule for the cloud computing resources from the one or more security parameters in the security policy definition. In one embodiment, FMS Configuration Manager component 114 will retrieve the saved policy data from FMS data store 112 and invoke a Config API to create the security policy rule using configuration service 124.

At block 515, method 500 receives a first event notification indicating an account information update comprising association of a member account with the administrative account. Organizations service 108 may manage and track the relationships between the administrative account and one or more member accounts associated with the administrative account. Member accounts may be associated with the same customer as the administrative account, but may have different resource access capabilities and permissions. In one embodiment, the organizations service 108 generates event based notifications each time there is a change in the member accounts associated with a given administrative account. For example, if a new member account is created, deleted or modified, the organizations service 108 may send a notification of this event to the message queuing service. In one embodiment, the FMS OrgManager component 110 will pick up event messages from the message queueing service and provide the indication of the member accounts or the change in member accounts to the FMS internal control API 106.

At block 520, method 500 associates the security policy rule with the member account. In one embodiment, FMS internal control API 106 stores the member account information received from organizations service 108 in FMS data store 112 along with the administrative account policy definition 102. By doing so, FMS internal control API 106 can propagate the security policy rule defined by policy definition 102 for the administrative account to one or more of the associated member accounts without having to reconfigure the policy separately for each member account.

Figure 6:
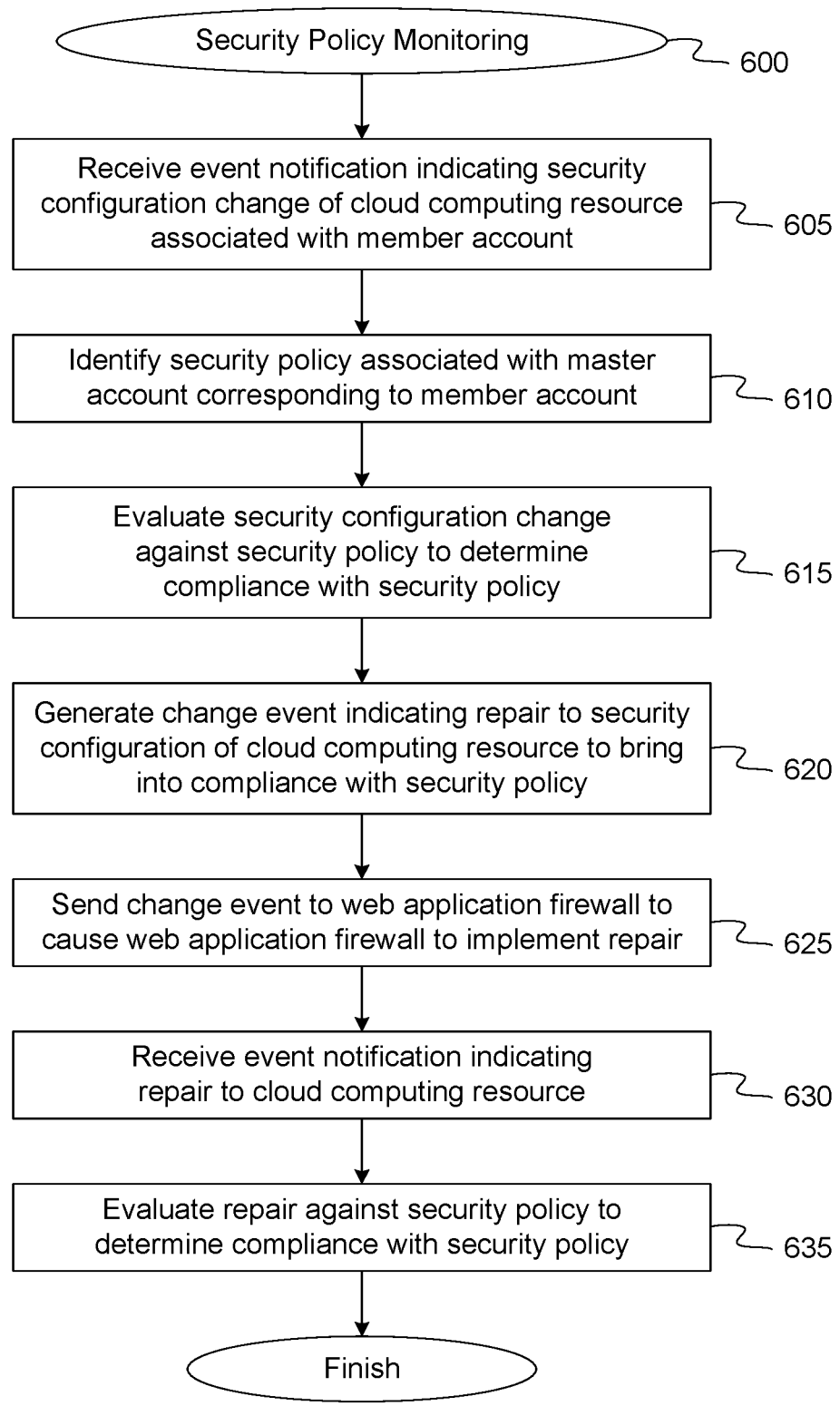
FIG. 6 is a flow diagram illustrating method of security policy monitoring, according to an embodiment of the present disclosure.

FIG. 6 is a flow diagram illustrating method of security policy monitoring, according to an embodiment of the present disclosure. The method 600 may be performed by processing logic that comprises hardware (e.g., circuitry, dedicated logic, programmable logic, microcode, etc.), software, firmware, or a combination thereof. In one embodiment, method 600 may be performed by the various components of FMS, as shown in FIGS. 1-4.

Referring to FIG. 6, at block 605, method 600 receives a first event notification indicating a security configuration change of a cloud computing resource associated with a member account. In one embodiment, configuration service 124 receives event notifications from web application firewall 118 about the current security configuration of resources associated with the web application firewall 118. Each of these resources may be assigned to a particular account, and may have a corresponding security configuration. For example, the application load balancer 122 may have an associated WebACL. If that security configuration were to change (e.g., if the WebACL was removed from application load balancer 122), web application firewall 118 may generate an event notification and provide that notification to configuration service 124.

At block 610, method 600 identifies a security policy associated with an administrative account corresponding to the member account. In one embodiment, FMS internal control API 106 identifies an entry in FMS data store 112 corresponding to the administrative account. The entry may include, for example, an identifier or other indication of the administrative account, an identifier or other indication of one or more member accounts associated with the administrative account, and an indication of the security policy including, the one or more parameters used to generate a corresponding security policy rule.

At block 615, method 600 evaluates the security configuration change against the security policy to determine compliance with the security policy. In one embodiment, upon receiving an event notification indicating a configuration change, configuration service 124 invokes FMS policy evaluator 116. FMS policy evaluator 116 compares the resource security configuration information received from web application firewall 118 to the applicable policy definition associated with the administrative account and propagated to the associated member accounts. In one embodiment, for example, the security policy rule may specify that application load balancer 122 should have an associated WebACL configured in a certain manner. If the event notification received by configuration service 124 indicates that the WebACL has been removed from application load balancer 122, or has been reconfigured in a way to be inconsistent with the security policy rule, FMS policy evaluator 116 may determine that the application load balancer 122 is in violation of the parameters of the security policy.

At block 620, method 600 generates a change event indicating a repair to the security configuration of the cloud computing resource to bring the security configuration into compliance with the security policy. Upon determination that the resource is not in compliance with the security policy, policy evaluator 116 may generate a change event notification indicating a repair action to be taken to bring application load balancer 122 back in compliance with the security policy. For example, the change event notification may include instructions to either add a WebACL to application load balancer 122 or reconfigure a current WebACL according to the policy parameters.

At block 625, method 600 sends the change event to a web application firewall associated with the cloud computing resource to cause the web application firewall to implement the repair to the security configuration of the cloud computing resource. In one embodiment, policy evaluator 116 sends the change event notification the message queuing service. Messages in this queue may be picked up by an FMS Change Worker 126 which can invoke a web application firewall (WAF) API. FMS Change Worker 126 instructs WAF 118 to fix application load balancer 122 by reapplying or reconfiguring the WebACL, for example.

At block 630, method 600 receives a third event notification indicating the repair to the cloud computing resource. Once the configuration is repaired, WAF 118 will send another notification to configuration service 124 which triggers a compliance re-evaluation by policy evaluator 116.

At block 635, method 600 evaluates the repair against the security policy to determine compliance with the security policy. If it is determined that the application load balancer 122 is now in compliance with the policy, the compliance result will be stored in the FMS data store 112.

Figure 7:
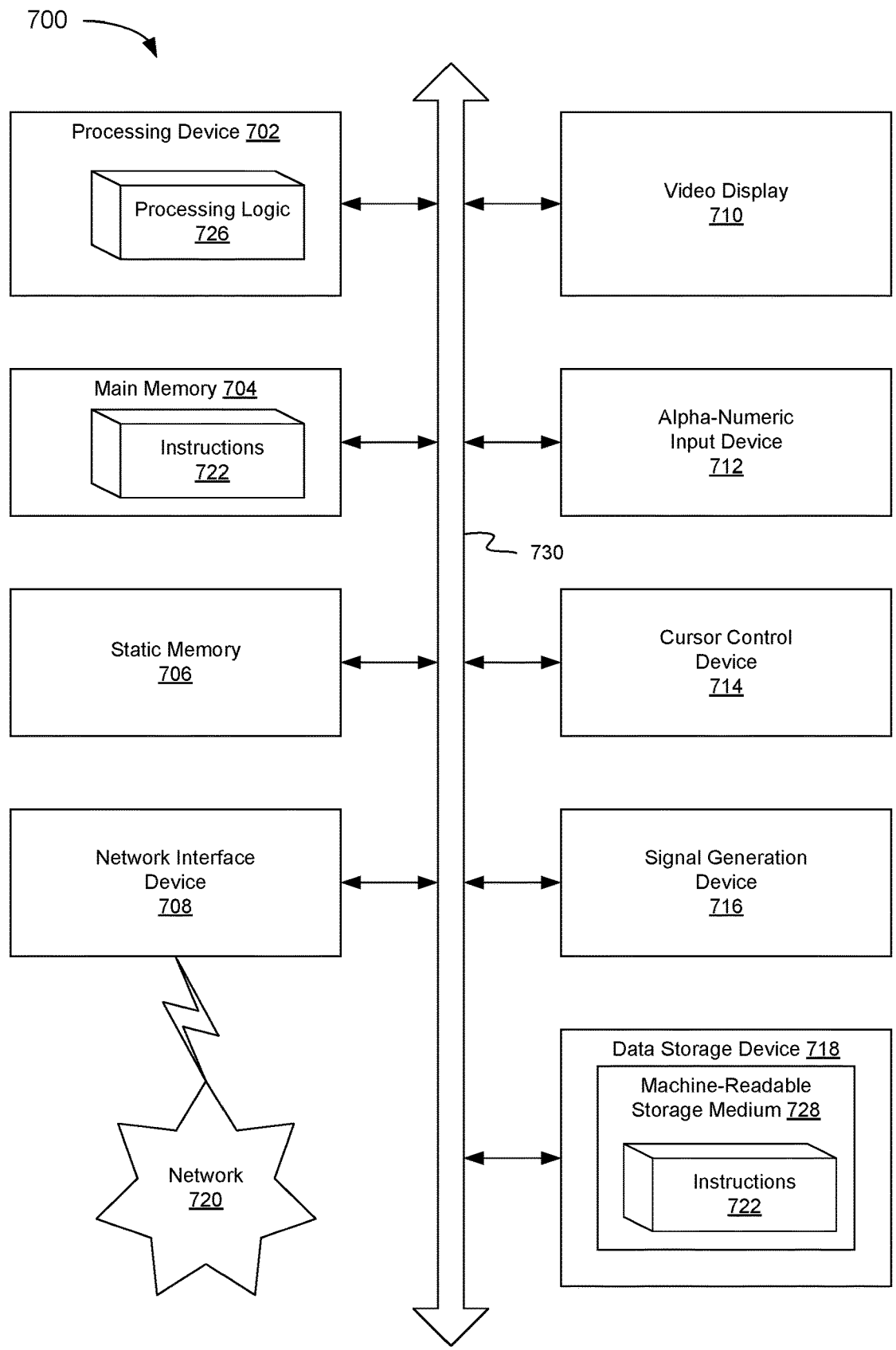
FIG. 7 depicts an example computer system which can perform any one or more of the operations described herein, in accordance with one or more aspects of the present disclosure.

FIG. 7 depicts an example computer system 700 which can perform any one or more of the methods described herein, in accordance with one or more aspects of the present disclosure. In one example, computer system 700 may correspond to a computing device capable of executing one or more components of the FMS architecture described herein. The computer system 700 may be connected (e.g., networked) to other computer systems in a LAN, an intranet, an extranet, or the Internet. The computer system 700 may operate in the capacity of a server in a client-server network environment. The computer system 700 may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 700 includes a processing device 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker). In one illustrative example, the video display unit 710, the alphanumeric input device 712, and the cursor control device 714 may be combined into a single component or device (e.g., an LCD touch screen).

The data storage device 718 may include a computer-readable medium 728 on which the instructions 722 (e.g., implementing the FMS) embodying any one or more of the methodologies or functions described herein is stored. The instructions 722 may also reside, completely or at least partially, within the main memory 704 and/or within the processing device 702 during execution thereof by the computer system 700, the main memory 704 and the processing device 702 also constituting computer-readable media. The instructions 722 may further be transmitted or received over a network via the network interface device 708.

While the computer-readable storage medium 728 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementa-

What is claimed is:

1. A method comprising:
receiving a security policy definition, the security policy definition comprising an identifier of an administrative account and one or more security parameters applicable to cloud computing resources;
generating a security policy rule for the cloud computing resources from the one or more security parameters in the security policy definition;
receiving a first event notification indicating an account information update comprising association of a member account with the administrative account;
associating the security policy rule with the member account;
receiving a second event notification indicating a security configuration change of a cloud computing resource associated with the member account;
evaluating, by one or more processors, the security configuration change against the security policy rule to determine compliance with the security policy rule;
generating a change event indicating a repair to the security configuration of the cloud computing resource to bring the security configuration into compliance with the security policy rule; and
sending the change event to a web application firewall associated with the cloud computing resource to cause the web application firewall to implement the repair to the security configuration of the cloud computing resource.

2. The method of claim 1, wherein receiving the second event notification indicating the security configuration change, comprises receiving an indication of at least one of addition, removal, or modification of an access control list associated with the cloud computing resource.

3. The method of claim 1, wherein associating the security policy rule with the member account comprises adding an indication of the member account to an entry in a data store corresponding to the administrative account, the entry comprising an indication of the security policy rule.

4. The method of claim 1, further comprising:
receiving a third event notification indicating the repair to the cloud computing resource; and
evaluating the repair against the security policy rule to determine compliance with the security policy rule.

5. A computing device comprising:
one or more processors; and
memory to store computer-executable instructions that, if executed, cause the one or more processors to:
receive a first event notification indicating a security configuration change of a cloud computing resource associated with a member account;
identify a security policy associated with an administrative account corresponding to the member account;
evaluate the security configuration change against the security policy to determine compliance with the security policy; and
generate a change event indicating a repair to the security configuration of the cloud computing resource to bring the security configuration into compliance with the security policy.

6. The computing device of claim 5, wherein the security configuration change comprises at least one of addition, removal, or modification of a security element associated with the cloud computing resource.

7. The computing device of claim 6, wherein the security element comprises an access control list.

8. The computing device of claim 5, wherein the cloud computing resource comprises at least one of an application load balancer, a content delivery network distribution, an instance of a virtual computing resource, or a managed service.

9. The computing device of claim 5, wherein the security policy is generated from a security policy definition, the security policy definition comprising an identifier of the administrative account and one or more security parameters applicable to cloud computing resources.

10. The computing device of claim 5, wherein the one or more processors further to:
receive a second event notification from an organizations service indicating that the member account is associated with the administrative account.

11. The computing device of claim 5, wherein the one or more processors further to:
send the change event to a web application firewall associated with the cloud computing resource to cause the web application firewall to implement the repair to the security configuration of the cloud computing resource.

12. The computing device of claim 5, wherein the one or more processors further to:
receive a third event notification indicating the repair to the cloud computing resource; and
evaluate the repair against the security policy to determine compliance with the security policy.

13. A method comprising:
receiving an event notification indicating a security configuration change of a cloud computing resource associated with a member account;
identifying a security policy associated with an administrative account corresponding to the member account;
evaluating, by one or more processors, the security configuration change against the security policy to determine compliance with the security policy; and
generating a change event indicating a repair to the security configuration of the cloud computing resource to bring the security configuration into compliance with the security policy.

14. The method of claim 13, wherein the security configuration change comprises at least one of addition, removal, or modification of a security element associated with the cloud computing resource.

15. The method of claim 13, wherein the security element comprises an access control list.

16. The method of claim 13, wherein the cloud computing resource comprises at least one of an application load balancer, a content delivery network distribution, an instance of a virtual computing resource, or a managed service.

17. The method of claim 13, wherein the security policy is generated from a security policy definition, the security policy definition comprising an identifier of the administrative account and one or more security parameters applicable to cloud computing resources.

18. The method of claim 13, further comprising:
receiving a second event notification from an organizations service indicating that the member account is associated with the administrative account.

19. The method of claim 13, further comprising:
send the change event to a web application firewall associated with the cloud computing resource to cause the web application firewall to implement the repair to the security configuration of the cloud computing resource.

20. The method of claim 13, further comprising:
receiving a third event notification indicating the repair to the cloud computing resource; and
evaluating the repair against the security policy to determine compliance with the security policy.

* * * * *